United States Patent
Mitchem

(10) Patent No.: US 6,365,837 B2
(45) Date of Patent: Apr. 2, 2002

(54) NON-TANGLING LINE

(76) Inventor: James D. Mitchem, 4160 5th Ave. SW., Naples, FL (US) 34119

( * ) Notice: Subject to any disclaimer, the term of this patent is extended or adjusted under 35 U.S.C. 154(b) by 0 days.

(21) Appl. No.: 09/829,964

(22) Filed: Apr. 11, 2001

Related U.S. Application Data

(63) Continuation-in-part of application No. 09/143,676, filed on Aug. 31, 1998.

(51) Int. Cl.$^7$ ............................................... H01B 11/06
(52) U.S. Cl. ............................... 174/113 C; 174/131 A; 138/110; 138/116; 138/DIG. 8
(58) Field of Search ......................... 174/113 C, 131 A; 138/110, 116, DIG. 8

(56) References Cited

U.S. PATENT DOCUMENTS

| | | | | |
|---|---|---|---|---|
| 460,606 A | * | 10/1891 | Vogler | 138/110 |
| 480,573 A | * | 8/1892 | Flagg | 138/116 |
| 1,389,143 A | * | 8/1921 | Kempton | 138/110 |
| 1,930,285 A | * | 10/1933 | Robinson | 138/110 |
| 2,538,019 A | * | 1/1951 | Lee | 138/116 |
| 2,929,408 A | * | 3/1960 | Weatherwax et al. | 138/110 |
| 3,110,753 A | * | 11/1963 | Witort | 174/113 C |
| 4,625,473 A | * | 12/1986 | Peterson et al. | 52/98 |
| 5,920,032 A | * | 7/1999 | Aeschbacher et al. | 174/47 |
| 5,952,615 A | * | 9/1999 | Prudhon | 174/113 C |
| 6,259,031 B1 | * | 7/2001 | Totland et al. | 174/110 R |

* cited by examiner

*Primary Examiner*—Dean A. Reichard
*Assistant Examiner*—Adolfo Nino

(57) ABSTRACT

A non-tangling line of conveyance includes a flexible outer and non-extendible tubular hose. Within the tubular hose a flexible non-extendible body member is placed. The body member is of a material that includes a plastic memory especially against torqueing. The body member is restrained against any substantial lateral movement. When the tubular conveyance is twisted in any direction, the inner body member undergoes a like motion. However, if the twisting of the tubular hose is released or ceased, the memory torque within the body member tends to force the line of conveyance into an untwisting state, thus avoiding any tangling, knotting or kinking of the conveyance line. The inner body member is restrained against substantially lateral movements by a multiple of electric conductors that are wrapped around the inner body member. In another embodiment, the inner body member is restrained against substantially any lateral movements by having a multiple of edges of said body member fitting snugly against an inner wall of the tubular hose of the conveyance line.

7 Claims, 2 Drawing Sheets

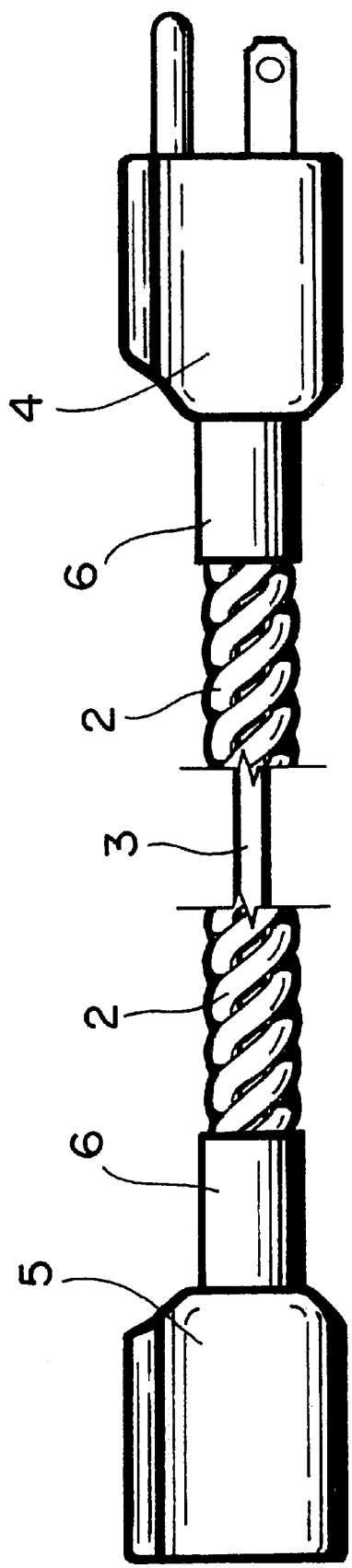
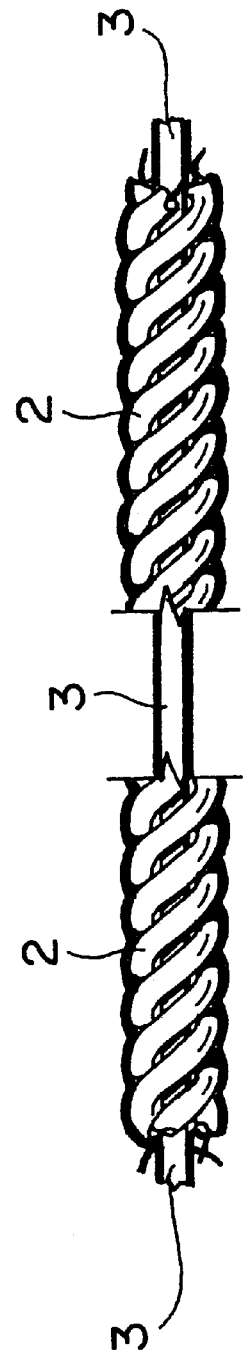
FIG. 1
FIG. 2

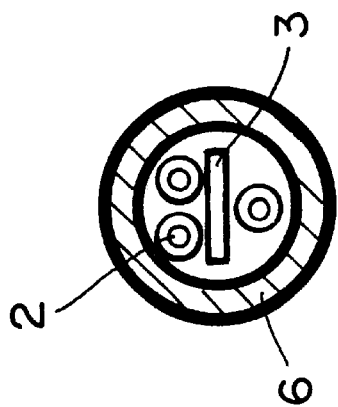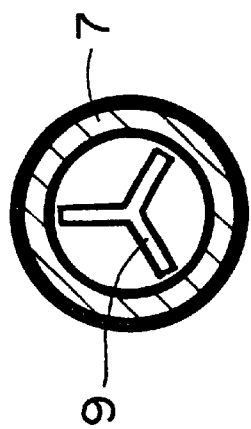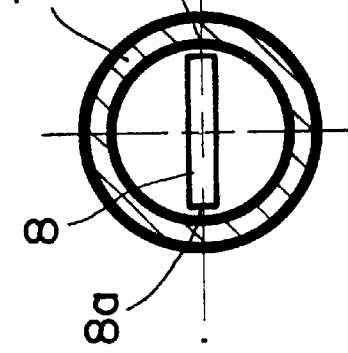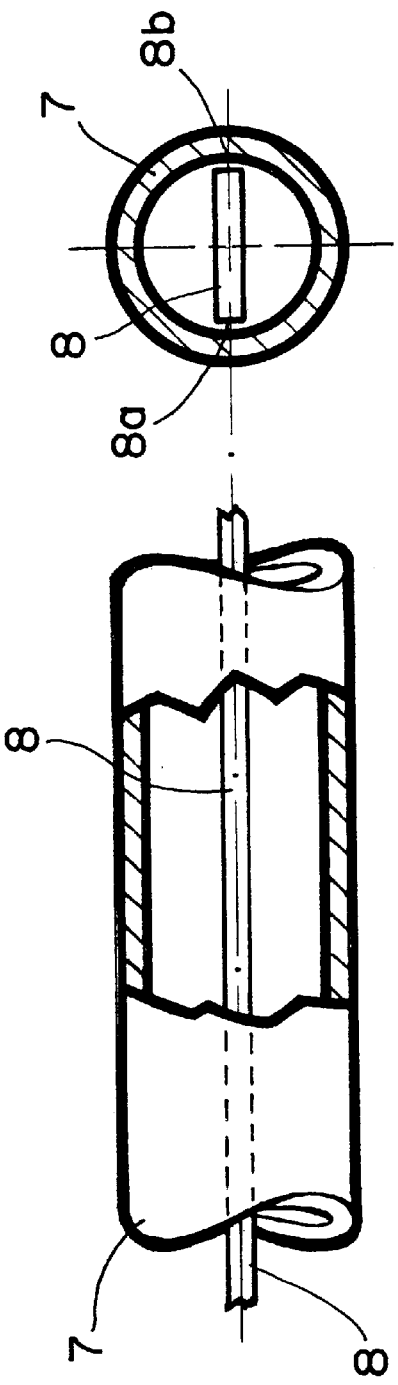
FIG. 3
FIG. 6
FIG. 5
FIG. 4

NON-TANGLING LINE

CROSS REFERENCE TO RELATED APPLICATION

This application is a Continuation-In-Part of application Ser. No. 09/143,676 filed on Aug. 31, 1998.

BACKGROUND OF THE INVENTION

The invention relates to the prevention of tangling, knotting or kinking of cords, lines and tubular conveyances, all having a tubular sheath at the outer circumference to protect or aid the conveyance within the tubular sheath.

The above mentioned cords, lines or tubular conveyances are known to get knotted or kinked when in use, such as electrical extension cords, air hoses or water hoses, unless time-consuming, distractive and sometimes laborious efforts are spent to prevent the knotting or the kinking or once the tangling, knotting or the kinking has occurred, to straighten or untangle the above noted conveyances for proper storage and for future use. As a result of the above noted tangling, knotting and kinking, the conveyances are subject to premature failure because of the material being overstressed where the kinks and knots occur. The above noted conveyances are non-elastic or substantially non-extendable.

Examples of different but related control means are described in the following patent documents:

Japanese Patent Number 64-33812, issued to Shigematsu on Feb. 3, 1989 describes four conductive wires juxtaposed adjacently to a plurality of spiral springs arranged in a rectangular shape and embedded in a core of insulating material.

U.S. Pat. No. 4,816,618, issued to Bongianni on Mar. 28, 1989, describes inner conductors in a dielectric matrix of a coaxial cable.

U.S. Pat. No. 4,629,827, issued to Baxter on Dec. 16, 1986, describes a cable having a jacket with tensile reinforcements by successive lengths of tape.

U.S. Pat. No. 4,487,641, issued to Bohannon, Jr. et al on Dec. 11, 1984 discloses a method and apparatus for a laminate shield on a rodent and light-guide cable.

U.S. Pat. No. 4,357,500, issued to Nilson on Nov. 2, 1982 is directed to an elongate member that is positioned in a portion of a telephone handset cord to prevent twisting and entanglement.

Australian Patent No. 108, 667, issued to Simon on Mar. 22, 1938, describes a flexible conductor of electricity with no provisions having been made to avoid any kinking or knotting.

U.S. Pat. No. 2,998,028, issued to Rohde on Aug. 29, 1961, describes a flexible hose or tube with one or more resilient members in its walls.

U.S. Pat. No. 2,619,126, issued to Eickmeyer et al on Nov. 25, 1952 is limited to a gasoline pump hose having a coiled leaf spring attached to an outside of the hose to induce a deliberate coiling of the Hose.

Japanese Patent No. 017,921, issued on Aug. 18, 1984 to Shiroishi et al is directed to a wiring cable for robots. The device consists of a coiled electric wire having multiple wiring conductors. The outer circumferential coil sections are covered with an elastic substance. This structure has an interior stretch inhibiter in the form of either rubber bands or a coil spring. The object of this patent is to limit the elastic extension of the basic coiled wiring within a certain range as long as it does not exceed the maximum elasticity of the interior rubber or the interior coil spring. This patent does not teach at all any arrangements to prevent tangling, knotting and/or kinking or entanglement in or of any tubular conveyances.

SUMMARY AND OBJECTS OF THE INVENTION

In view of the above noted problems, the objects of the invention are to provide a non-kinking or non-knotting or non-entanglement to elongated and substantially non-extendable cords, lines or tubular conveyances. The invention at hand does not make use of expansion and/or contraction but focuses on restriction. The present invention restricts itself to the use with a portable tubular conveyance such as portable extension cords, garden hoses, air hoses and similar conveyances which are not of a coil or curl code type construction. The present invention uses a flexible body member extending the full length of the conveyance. The flexible body is not elastic and therefore cannot be extended. It can be bent laterally at its extended length but it is resistant to any twisting. As a matter of fact, the flexible body member has a torque memory, meaning, that when any twist is introduced into the body member, it tends to forcefully return to its untwisted state. This phenomenon has been discovered after many experiments and prevents any conveyance of the above described category from kinking, knotting or entangling.

The elongate body member can be incorporated into an electrical conductor having at least two or more electrical conductors twisted or wrapped around the body member, thus acting as a core member and thereafter having an insulating sheath or tube installed or otherwise attached to the outside of the conductors. The elongated body member can take the shape of a round, square or rectangular body. It is important that the elongated body be restricted to substantially any lateral movements within the tubular conveyance so as to keep the elongated body member substantially within the center of the conveyance.

This principle equally applies to water hoses or air hoses. In this application, the elongated body member consists of a rectangular but somewhat thin body being placed within the tubular conveyance. The elongate body member is of a width to substantially span the interior wall diameter of the tubular conveyance. It can now be seen that when the tubular conveyance is subjected to any twisting, which would be the beginning of any tangling, knotting or kinking, the elongated body member resists the twisting motion and tends to return to its untwisted state because of its plastic torque memory. The more the conveyance is twisted, the more the elongated body member is torqued, the more it tends to forcefully return to its untwisted state.

Under certain circumstances, especially when applied to heavy duty water or air conveyances, the elongated member can take shape of an extruded triangular configuration whereby at least three contact points are obtained against the interior wall of the conveyance.

BRIEF DESCRIPTION OF THE DRAWINGS

FIG. 1 is a schematic illustration of a non-tangling non-knotting line showing a body member wrapped by a multiple of electric conductors;

FIG. 2 is a cross-section of FIG. 1 including an outer tubular sheath;

FIG. 3 shows an assembled non-knotting electric conductor;

FIG. 4 illustrates a non-tangling and non-knotting hollow conveyance with a body member located therein;

FIG. 5 is a cross-section of FIG. 4;

FIG. 6 illustrates is a cross-section of FIG. 4 having a differently shaped body member therein.

DETAILED DESCRIPTION OF THE INVENTION

FIG. 1 shows the basic concept of the invention directed to an electric extension cord, for example. Reference character 2 illustrates a multiple of electric conductors being twisted or wrapped about a straight and non-extendible body member 3. The number of electric conductors 2 wrapped around the body member 3 can be anywhere from two or more. The non-extendible body member 3 should be made of a plastic material such as NYLON, DACRON, TEFLON also known as polyamides, polyethylenes and tetrafluoroethylenes, respectively.

FIG. 2 shows the conveyance of FIG. 1 in its finished state. The multiple wrappings of electrical conductors 2 around the non-extendible body member 3 is covered with a sheath or tubular element 6. The ends of the conductors 2 are secured in a male connector 4 at one end while the electrical conductors 2 are secured in a female connector 5 at the other end. Thereby FIG. 2 typically represents an extension cord generally used in industry as well as in home use. Also in FIG. 2, the body member 3 is shown in a flattened or rectangular shape.

Turning now to FIG. 3 there is shown the cross-section of the conveyance of FIG. 2. The rectangular body member 3 can clearly be seen as being trapped or locked between the three conductors 2. As described above, it is important to the basic concept of the invention that the body member 3 participate in any twisting of the basic conveyance that naturally occurs in an ordinary use of the conveyance to take advantage of any torque memory created in the body member to avoid any tangling, knotting or kinking of the extension cord shown in FIGS. 2 and 3.

Turning now to FIGS. 4 and 5 which illustrate the application of the basic concept of the invention to a water or an air hose. In this respect, FIG. 4 shows an outer tubular and flexible member 7 which could be the surrounding mantle of an air or water hose. Such mantles are usually reinforced by nylon braids in water hoses or by metal strands in braids or coils in air hoses. Both of the above hoses are still subject to tangling or knotting if not further treated by way of the present invention, to this end, FIG. 4 shows a rectangular or flattened body member 8 inside the tubular hose 7 and the width of the rectangular member is such that each edges 8a and 8b of the rectangular body member 8 will abut against the inside wall of the tubular member 7 at diametrically opposed points in a snug fit. This way, whenever the outer tubular hose is subjected to any twisting motion, the body member 8 will participate in such a twisting motion but as soon as the twisting motion of the tubular hose ceases or is released, the rectangular body member 8 tends to force the tubular hose 7 to untwist because of the plastic torque memory prevailing in the body member 8.

FIG. 5 is a cross-section of the tubular conveyance of FIG. 4. This cross-section clearly shows the rectangular body member 8 as it snugly fits against the inner wall of the tubular hose 7 with its edges 8a and 8b. Depending upon the material being used in the mantle of the tubular hose 7, the hose may collapse upon the inner rectangular body member 7. In this instance, it is advisable that the inner body member 8 have a multi-arm shape as is shown in FIG. 6. Again, the outer tubular and flexible hose is shown at 7, while the interior body member is show in a multi-arm shape, in this case as a triangular shape 9, although quadrangular shapes may be used also. The advantage of the muti-arm inner body member readily becomes apparent in FIG. 6. Such a shape not only reinforces and/or supports the shape of the outer flexible tubular hose but also prevents a tangling, knotting or kinking of the basic conveyance because the muti-arm inner body member 9 will participate in any twisting motion of the tubular conveyance and the plastic torque memory within the body member tends to untwist the conveyance.

In the above noted construction, as shown in FIGS. 4 to 6, it should be noted that the presence of the body members 8 or 9, whatever cross-section they are, does not interfere at all with the medium passing through the conveyance, such as water or air. With other words, the body member does not interfere with the medium.

What I claim is:

1. A non-tangling conveyance line comprising: a flexible tubular and non-extendable hose having a cross-section and a length with intermediate ends;

an inner flexible and non-extendable body member placed along the length of and within said outer tubular hose;

means for laterally restricting any substantial movement of said body member relative to a longitudinal axis of said conveyance within said tubular hose;

said body member is made of a material that tends to force an untwisting of said conveyance after having undergone a twisting motion to thereby avoid a tangling of said conveyance line.

2. The conveyance line of claim 1, wherein said body member is of a flattened and rectangular cross-section.

3. The conveyance line of claim 1, wherein said means for laterally restricting is a multiple of electrical conductors wrapped around said body member.

4. The conveyance of claim 3, wherein each a male and a female connector is securely fastened to electrical conductors at each end, respectively, of said conveyance line.

5. The conveyance line of claim 1, wherein said means for laterally restricting said body member includes edges of said body member snugly fitting against an interior wall of said tubular member.

6. The conveyance line of claim 5, wherein said edges are two to snugly fit against said interior wall of said tubular hose.

7. The conveyance line of claim 5, wherein said edges are at least three to snugly fit against said interior wall of said tubular hose.

* * * * *